United States Patent [19]

Jones et al.

[11] 4,425,182

[45] Jan. 10, 1984

[54] BLENDING TAPE DISPENSER

[75] Inventors: Wallace R. Jones, Waite Hill Village; John F. Haas, Chagrin Falls; Sal Ferro, Sagamore Hills, all of Ohio

[73] Assignee: The Excello Speciality Co., Cleveland, Ohio

[21] Appl. No.: 251,479

[22] Filed: Apr. 6, 1981

[51] Int. Cl.[3] ......................... B32B 31/08; B44C 7/02

[52] U.S. Cl. .................................... 156/554; 156/527; 156/577; 156/584; 242/75.43; 242/156.2

[58] Field of Search ............... 156/554, 523, 527, 574, 156/577, 526, 584; 242/156, 156.2, 75.4, 75.43

[56] References Cited

U.S. PATENT DOCUMENTS

| | | | |
|---|---|---|---|
| 3,044,535 | 7/1962 | Kreuger | 156/584 |
| 3,107,193 | 10/1963 | De Neui et al. | 156/527 |
| 3,128,219 | 4/1964 | Cummings | 156/584 |
| 3,136,462 | 6/1964 | Knutson | 156/527 |
| 3,152,032 | 10/1964 | Waltz | 156/554 |
| 3,274,038 | 9/1966 | Karn | 156/247 |
| 3,369,952 | 2/1968 | Rieger | 156/577 |
| 3,553,060 | 1/1971 | Waltz | 156/554 |
| 3,834,972 | 9/1974 | Sava | 156/554 |
| 3,950,214 | 4/1976 | Pool et al. | 156/527 |
| 4,067,762 | 1/1978 | Rhoads | 156/577 |
| 4,090,914 | 5/1978 | Hauk et al. | 156/523 |
| 4,096,021 | 6/1978 | Pool et al. | 156/527 |

*Primary Examiner*—Michael G. Wityshyn
*Attorney, Agent, or Firm*—Fay & Sharpe

[57] ABSTRACT

Layered blending tape comprised of a mask layer having an adhesive layer on one surface thereof, an elongated mask section adhered to a portion of the adhesive layer longitudinally thereof, and a release strip section releasably adhered to the remaining portion of the adhesive layer is spirally wrapped around a core to form a roll. This roll is mounted on a tape dispenser. The dispenser includes a tape roll mounting assembly and a guide roller-engaging surface assembly for separating the release strip section from the adhesive layer during a tape dispensing operation. The tape roll mounting assembly includes a hub rotatably mounted to a frame by an axle and retained by a retaining nut. A coil spring received over the axle is interposed between the retaining nut and the outer side face of the hub. A brake pad is operatively interposed between the other hub side face and the frame. The forward end of the tape is threaded through the guide roller-engaging surface assembly so that as tape is unrolled from the roll and withdrawn from the dispenser, the release strip section is continuously separated or removed from the tape adhesive layer to expose that portion of the adhesive layer disposed therebeneath. Tape backlash is prevented by adjusting the coil spring compression by means of the retaining nut. Tape dispensed from the device may be advantageously used for marking some workpiece prior to painting. Also, the device may be operatively mounted adjacent a supply of masking paper so that the tape is in general alignment with a lateral side edge of the paper. This then facilitates mating and simultaneous dispensing of the tape and paper.

18 Claims, 5 Drawing Figures

BLENDING TAPE DISPENSER

BACKGROUND OF THE INVENTION

This invention pertains to the art of selectively dispensing or feeding a layered mask or tape. The invention finds particular application in the painting industry for dispensing a blending tape which defines a painting mask and will be described with particular reference thereto. However, it will be appreciated that the invention has broader applications and may be adapted to use in other environments.

In the painting industry, it is often desired to spray paint only a portion of a product or workpiece with one color or tone. Frequently, the workpiece is painted with the one color or tone on one side of a demarcation zone and with another color or tone on the other side of the demarcation zone. This type of two-tone painting is often associated with the automobile industry, although it is also utilized for other consumer products. Demarcation zones are also commonly defined in refinishing paint work between damaged and non-damaged areas of a workpiece. It is advantageous to provide a definite demarcation zone at and along the edge of the damaged area, even though this area is to be repainted the same color as the non-damaged area.

Various apparatus are known in the art for selectively dispensing masking tape as well as and other adhesive tapes, labels and strips. In the most basic of these prior apparatus, a roll of masking tape is mounted on a hub or spindle. The apparatus supports the hub as well as a cutting edge for cutting the tape into desired lengths. The masking tape is usually quite narrow when compared with the area to be protected from overspraying. Accordingly, to mask larger areas, apparatus or devices have been developed which dispense a continuous sheet of masking paper along with a strip of conventional masking tape affixed to one side edge thereof.

A particular drawback to this type of system is that paint tends to form a ridge along the edge of the masking tape. Removal of this objectionable ridge necessitates additional finishing steps.

Through the years, various attempts have been made in an effort to improve paint masking systems such that these additional finishing steps could be eliminated or at least reduced. Generally, these systems have required the use of special masking tapes. For example, one system uses a non-metallic tape which has an adhesively backed portion and a nonadhesively backed portion. The tape is folded longitudinally between the adhesive and nonadhesively backed portions such that the nonadhesive portion flares outward. The tape is applied to a workpiece so that the flared portion forms a tapered pocket along the demarcation zone which generates a a feathered paint edge thereat during painting. The resilient memory of the tape and buckling characteristics of the nonadhesive portion when the tape follows a curved demarcation line tend to cause variations in the feathered or tapered pocket, hence variations in the tapered paint edge. The quality of the work product achieved in using this system is directly related, in large part, to the skill of the painter.

An improved paint masking system is illustrated in the commonly assigned U.S. patent application Ser. No. 165,616, filed July 3, 1980. The masking system of this application provides a feathered paint edge at the demarcation zone and is comprised of a layered structure. The layered structure includes a mask layer having one surface coated with adhesive defining an adhesive layer, a mask section adhered longitudinally along a portion of the adhesive layer, and a release strip adhered longitudinally along the remaining portion of the adhesive layer. In use, the release strip is removed so that the mask may be adhesively secured to the mask along some desired demarcation zone. A pressing type force is applied to the mask along the demaraction zone for causing the mask section to diverge outwardly of the workpiece. During painting, a portion of the paint spray migrates into the pocket-like area thus formed to generate a feathered paint edge. When this masking system takes the form of a tape having some indefinite length, removing the release strip and thereafter positioning the tape on the workpiece becomes an awkward and difficult manual manipulation. In this form of the system, some type of dispensing apparatus or device is desirably employed.

To that end, a number of structures have heretofore been available for feeding or dispensing layered tapes and/or labels. However, several problems contribute to the failure of these dispensers in finding ready utility in the painting industry, particularly for the new system described above. For example, none of these prior dispensers are adapted for use in conjunction with a masking paper feeder and none are adapted to readily accommodate the changing and/or replacement of tape rolls. Rather, changing of the rolls typically requires disassembly of the hub assembly as well as other cumbersome manipulations. Further, the tape roll brakes included on some prior dispensers are difficult to maintain and require constant adjustment.

The present invention contemplates apparatus which overcomes the foregoing problems and provides a new and improved layered tape and painting mask dispensing apparatus which is simple in design, easy to use and readily adapted to use in a wide variety of applications or environments.

SUMMARY OF THE INVENTION

In accordance with the present invention, the combination of a layered tape and a dispensing apparatus thereof is provided. The layered tape is in roll form with the tape being wrapped spirally around a core. The tape includes a mask layer having one surface coated by an adhesive layer. An elongated mask section is adhered to a portion of the adhesive layer longitudinally thereof and a release strip is adhered to the remaining portion of the adhesive layer to also extend longitudinally thereof. The release strip is adapted to be removed from tape and thereby expose the adhesive layer therebeneath. The tape dispenser includes a tape mounting hub dimensioned to frictionally receive the tape roll core thereover. The hub is rotatably mounted on an axle and a braking means is provided for selectively controlling the hub angular velocity. The braking means enables backlash of the tape to be controlled and eliminated. A separating means is disposed adjacent the hub for continuously separating the release strip from the adhesive and other layers of the tape during tape dispensing operations.

In accordance with another aspect of the invention, a masking paper feeder is provided operatively adjacent the tape for allowing the tape to be adhesively mated to a side edge of the masking paper during a tape dispensing operation.

According to yet another aspect of the invention, there is provided a layered tape dispensing apparatus. The apparatus includes a frame having a base wall with first and second flanges and an axle extending in the same direction transversely outward therefrom. A tape mounting assembly is rotatably journalled on the axle and a tape roll retainer disposed between the first and second flanges is selectively detachable from one of the flanges. A separating means for separating selected ones of the tape layers from each other is mounted on the base wall adjacent the tape mounting assembly.

A principal advantage of the invention is that it is ideally suited to the painting industry in that it readily accommodates dispensing a layered tape and paint mask while automatically removing release strips associated therewith.

Another advantage of the present invention is that it is readily adaptable for use with different tape roll sizes and includes a roll brake or velocity control which is easily adjusted for different roll widths.

Still another advantage of the present invention is that tape rolls are easily replaced with the brake adjustment being unaffected by such replacement.

Yet other advantages will become apparent to those of ordinary skill in the art upon reading and understanding the following detailed description.

DESCRIPTION OF THE FIGURES

The invention may take form in various parts and arrangements of parts. The FIGURES are set forth to illustrate a preferred embodiment only and are not to be construed as limiting the invention.

DESCRIPTION OF THE PREFERRED EMBODIMENT

Figure 1:
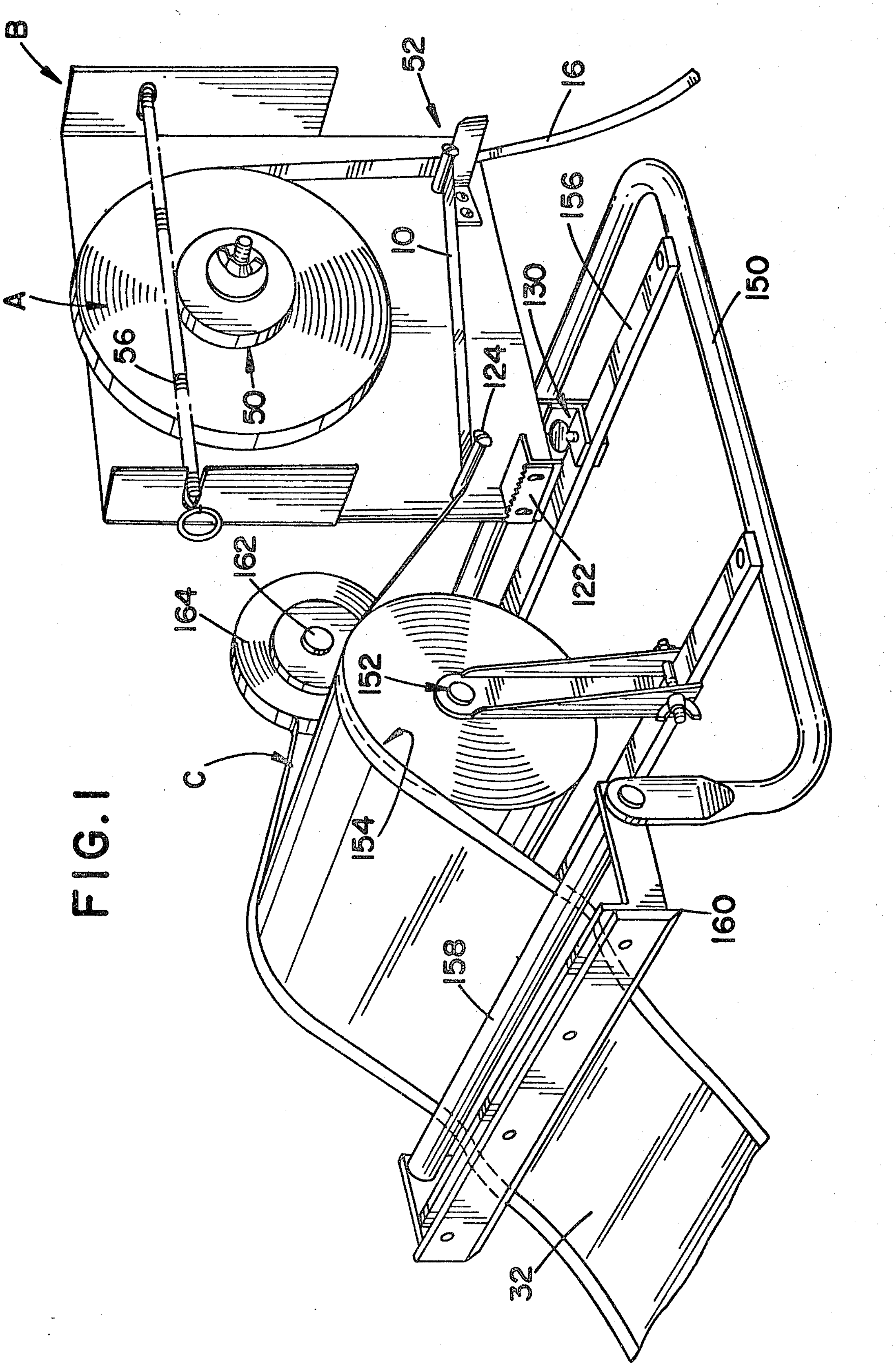
FIG. 1 is a perspective view of a painting mask dispensing apparatus including a roll of layered tape, a tape dispenser, and a masking paper feeder in accordance with the present invention.

With reference to FIG. 1, the present invention contemplates a painting mask dispensing apparatus which includes a roll of layered tape A, a layered tape dispenser or feeder B, and a masking paper feeder C. The tape dispenser B automatically separates and feeds the layered tape to the masking paper feeder C. The separated tape from the tape dispenser B overlies one side edge of the masking paper such that the masking paper is dispensed simultaneously with the tape adhered to the one edge.

Figure 2:
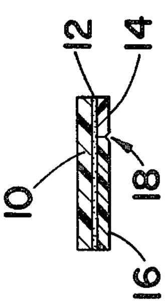
FIG. 2 is a lateral cross-sectional view of the layered tape of FIG. 1.

The layered tape from the roll A is illustrated in FIG. 2. This tape includes a mask layer 10 which spans the width of the tape. One surface of the mask layer is coated by an adhesive layer 12 firmly adhered thereto. A mask section 14 which is much narrower in width than the mask layer 10 is adhered to the adhesive layer at one edge of the tape so as to extend longitudinally thereof. An elongated release strip 16 is also adhered to the adhesive layer 12 and extends longitudinally thereof to cover that portion of which is not covered by the mask section 14. Typically, the mask section 14 and the release strip 16 are integrally formed and then severed or die cut as at sever line 18 following mating with the adhesive layer. This allows the mask section to remain adhered to the adhesive layer while the release strip is selectively removed for exposing the adhesive layer. In the preferred embodiment and merely by way of example, the mask layer 10 is constructed from a thin paper of approximately 3 or 4 mils, the mask section and the release strip are constructed of 60 pound paper coated with polyethylene on the surface which faces the adhesive, and the adhesive layer 12 is comprised of an acrylic-type adhesive.

Figure 3:
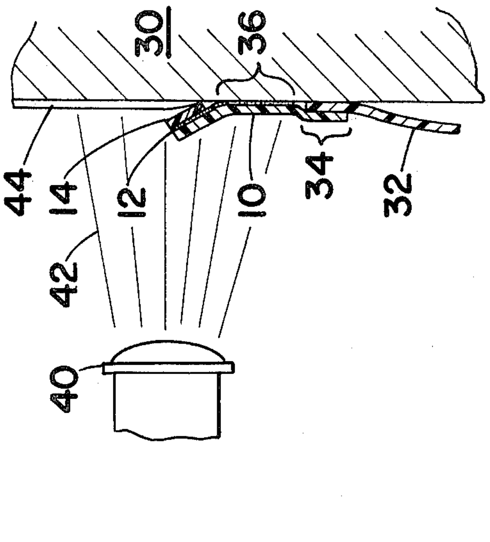
FIG. 3 is an illustration of a painting mask applied to a workpiece in accordance with the present invention.

Utilization of the above-described layered tape is illustrated in FIG. 3. A workpiece 30 includes a surface which has been cleaned and prepared for spray painting. The layered tape has had the release strip removed and is adhered to an edge of a masking paper sheet 32. Only a first portion 34 of the adhesive layer which is exposed by removing the release strip is adhered to the masking paper 32. A second portion 36 of the adhesive layer which is also exposed by removing the release strip is adhered to the work surface adjacent to, coextensive with and outboard of some predetermined demarcation zone. This demarcation zone separates that area of the work surface which is to be painted from that area which is to be left unpainted. A pressing type force is then firmly applied against the outside of the mask layer 10 substantially coextensive with the demarcation zone for causing the mask section 14 to be lifted automatically from the work surface. The mask section is thus caused to define a pocket-like area adjacent to and coextensive with the demarcation zone. A paint sprayer, schematically shown and designated by numeral 40, may then be used to paint spray 42 in a direction generally normal to the workpiece 30. In this manner, the mask section 14 prohibits paint from being sprayed directly into the pocket-like area. Rather, a portion of the paint spray simply migrates into the pocket-like area during the course of painting the remainder of the workpiece. The amount of paint so migrating varies inversely with the distance into the pocket-like area. Accordingly, a paint layer 44 built up on the work surface is feathered or tapered into the pocket-like area defined by the mask section 14. Tapes which produce a feathered or tapered paint edge adjacent the demarcation zone are hereinafter referred to as blending tapes.

The masking layer 10 and the masking paper 32 protect the remainder of the workpiece from paint overspray as is conventional. Following painting, the entire paint mask defined by the layered or blending tape and the masking paper 32 are removed from cooperative association with the workpiece 30. The feathering of the paint layer 44 along the demarcation zone eliminates the need for additional finishing steps which would otherwise be required to remove any paint ridges and/or blend the paint layer smoothly into the workpiece.

Figure 4:
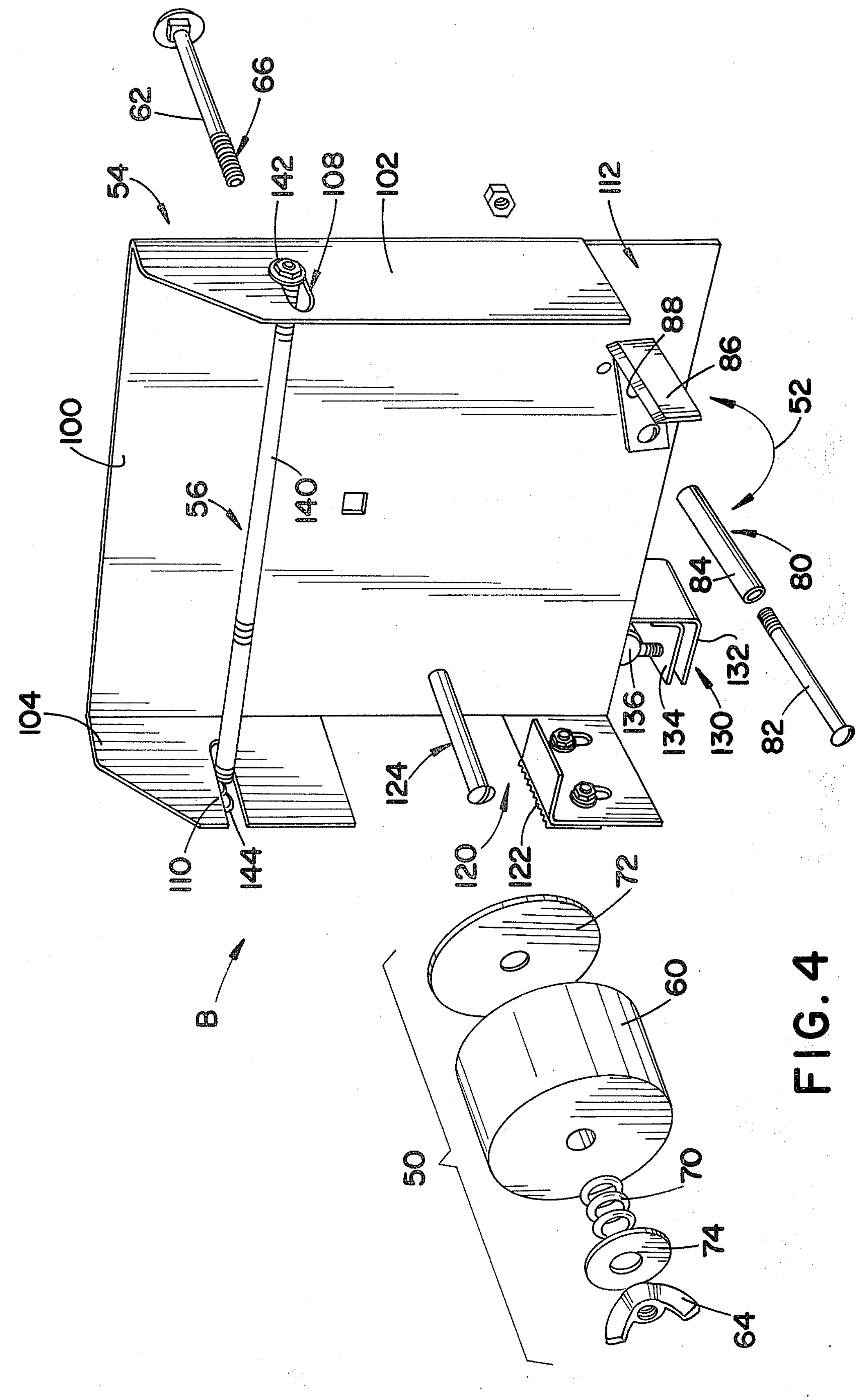
FIG. 4 is an exploded view of the tape feeder of FIG. 1.

An exploded view of the tape feeder B is illustrated in FIG. 4. The tape feeder includes a tape roll mounting assembly 50 for rotatably mounting the roll A of layered or blending tape. A tape layer separating means 52 for separating the release strip from the adhesive layer is disposed adjacent the tape mounting assembly 50. A frame 54 supports the tape roll mounting assembly 50 and the separating means 52. A tape roll retainer 56 for retaining the tape roll A on the tape roll mounting assembly 50 is also associated with the frame 54.

The tape mounting assembly 50 includes a hub 60 which is rotatably mounted on an axle 62. An internally threaded retaining member or nut 64 is received on a threaded end portion 66 of the axle 62. The retaining nut holds the hub on the axle in a stable position relative to the frame 54. The tape roll mounting assembly 50 also includes a brake means for controlling the angular velocity of the hub to eliminate backlash of the tape. This brake means includes a longitudinally compressible spring 70 which is interposed on the axle 62 between outer side face of the hub 60 and the retaining nut 64. An annular brake pad 72 is received by the axle 62 intermediate the wall of frame 54 and the other side face of hub 60. It will thus be appreciated that rotation of the retaining nut 64 on the threaded portion 66 of the axle adjusts the compression of the spring 70. The amount of compression, in turn, adjusts the frictional engagement between the hub 60 and the brake pad 72. The retaining nut 64 is rotated until the braking means creates sufficient drag to prohibit backlash of the tape. That is, when the user stops pulling the tape from the roll or greatly reduces the force with which the tape is being pulled, the brake means prohibits the roll from coasting and unraveling the tape. A washer 74 interposed between the spring 70 and the retaining nut 64 isolates the rotation of the hub 60 from the retaining nut 64 to prevent hub rotation from charging the predetermined adjustment for the brake means.

The separating means 52 includes a guide 80 about which the blending tape extends and changes its direction of travel by an angle of about 90 degrees. The guide includes a pin 82 secured to the frame 54 and a roller 84 rotatably mounted on the pin 82. Alternately, the guide roller 80 could be replaced by a guide with a smooth, rounded surface. The separating means further includes an engaging surface 86 for directing the release strip 16 away from the masking layer 10 as the masking layer 10 transverses around the guide roller 80. The engaging surface 86 includes a sharp blade-like edge 88 disposed closely adjacent roller 84. Specifically, the blade-like edge is disposed aligned with the lower rear end area of the roller 84.

The frame 54 includes a base wall 100 having axle 62 mounted thereto so as to extend substantially normally outward therefrom. Extending outwardly from the base wall in the same direction as the axle 62 are first and second flanges 102, 104 which are laterally spaced apart from each other with the axle being generally centrally disposed thereof. The first flange 102 has an elongated aperture 108 extending parallel to the axle 62 and the second flange 104 has an elongated slot 110 which similarly extends parallel to the axle 62. Also, slot 110 is open at the outer side edge of flange 104 for reasons which will become apparent. The first flange 102 terminates at some area spaced from separating means 52 to define an access opening 112 accommodating each access to the separating means. Access opening 112 also facilitates threading and starting the tape through the separating means.

The second flange 104 includes an outlet opening 120 therethrough. Mounted on the flange 104 adjacent the bottom or lower end of the outlet opening is a cutting edge 122 and a guide roller 124 is mounted to frame base wall 100 so as to be positioned in the outlet opening above and inboard of cutting edge 122. The tape passes between the cutting edge and the guide roller with its mask layer side facing toward the guide roller and its adhesive side facing toward the cutting edge. The guide roller 124, like the guide roller 80, is mounted by means of a pin which passes therethrough and into base wall 100.

The frame 54 further includes a mounting bracket 130 for mounting the tape feeder B in an operative position. This mounting bracket includes a first generally horizontal plate 132 and a second generally horizontal plate 134 to receive, for example, a table surface or flat bar therebetween. A set screw 136 clamps the received structure in the mounting bracket thus mounting the tape feeder securely.

The tape roll retainer 56 includes an elongated spring section 140 extending between the first flange 102 and the second flange 104. A first end 142 of the retainer is retainingly received in the elongated aperture 108 and a second end 144 includes an enlarged portion such as a ring or the like which functions as a handle or grip means. The elongated spring section 140 is extended to maintain the retainer in position by having first end 142 bear against the exterior of the first flange 102 and pulling the enlarged portion at second end 144 to the position shown in FIG. 4 so it bears against the exterior of the second flange 104. The retainer 56 may be moved to a non-retaining position by grasping the enlarged portion at end 144, elongating the spring section 140, and sliding the enlarged portion out of slot 110.

Referring again to FIG. 1, the masking paper feeder C may comprise any type of known feeder and typically includes a paper feeder frame 150. A support 152 for a roll 154 of the masking paper 32 is disposed on the frame 150. The tape dispenser B is mounted by means of the mounting bracket 130 to a cross bar 156 of feeder C. The tape dispenser B and the support 152 are mounted relative to or aligned with each other such that the blending tape partially overlaps a lateral side edge of the roll 154. Specifically, and as illustrated in FIG. 3, section 34 of the tape adheres to the masking paper 32 as section 36 and masking section 14 overhang from the edge of the paper. A guide means such as a roller 158 and a cutting edge 160 are also advantageously mounted on the paper feeder frame 150.

Optionally, the paper feeder C may include a support 162 for a roll 164 of conventional adhesive or masking tape. The tape support 162 is aligned with the roll of masking paper such that the conventional masking tape partially overlies the other lateral side edge of the paper. A portion of the adhesive face of the conventional masking tape 164 which is not adhered to the masking paper may be desirably used for securing it to the workpiece.

Figure 5:
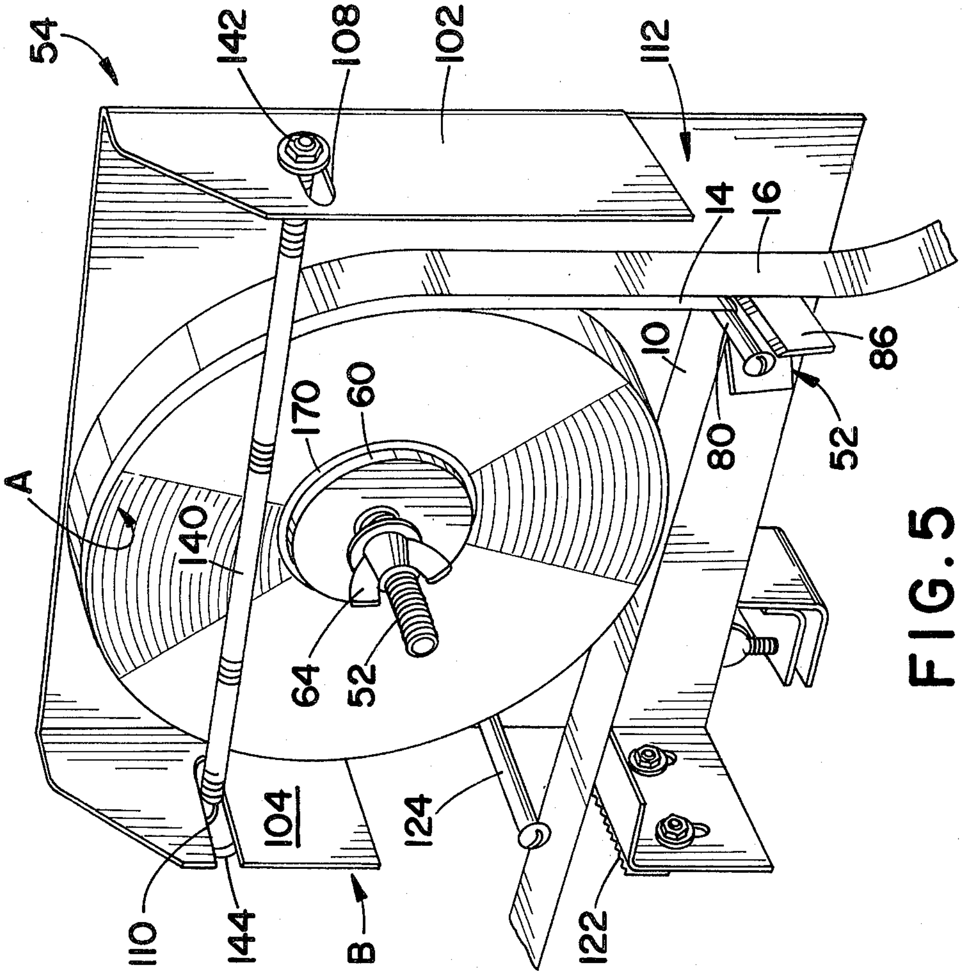
FIG. 5 is a perspective view of the tape feeder of FIG. 1 dispensing a layered tape.

Referring to FIG. 5, and with regard to use of the painting mask dispensing apparatus of the present invention, an operator grasps the enlarged portion of retainer second end 144 to extend spring 140 and slide the end outwardly of slot 110. If a roll of tape A or its core 170 are still mounted on the tape mounting assembly 50, the operator slides it off by pulling along the axis of the axle 62. A roll of the blending tape which has some size or width may then be slid axially along the axle toward the frame. The core 170 and hub 60 are relatively dimensional such that the interior surface of the core 170 frictionally engages the exterior of the hub. The brake pad 72 spaces the tape roll a small distance from the frame base wall 100.

The end of the tape is then fed to a position adjacent the separating means 52 and a short length of the release strip 16 is manually separated from the adhesive layer 12. The mask layer 10 and the masking section 14 are next fed between the guide 80 and the engaging surface

86 with the end of the tape being pulled through the outlet opening 120. The release strip is positioned so as to slide across the engaging surface 86 and out the bottom of the frame to an adjacent trash receptacle or the like.

The enlarged portion of retainer end 144 may then be replaced in slot 110 with ends 142, 144 adjusted such that the longitudinal extent of spring 140 is parallel to and slightly spaced from the outer side face of tape roll A. If the newly installed roll is the same size as the preceding roll, the brake means generally does not need to be readjusted. To check the brake adjustment, however, the operator rapidly pulls the tape through the outlet opening 120 and then suddenly stops the pulling. If the brake means is properly adjusted, the tape roll A will stop rotating immediately. If the roll continues to turn thus feeding tape toward the separating means 52, additional braking is required. To increase braking, the operator tightens the retaining nut 64. Likewise, if the tape is hard to pull, the operator may loosen the retaining nut for decreasing the braking force.

In the broadest application of the invention, the dispenser B may be used by itself for selectively dispensing desired lengths of the blending tape A for masking a workpiece in the manner described above. In this type of application, the tape is pulled outwardly of the dispenser through outlet opening 120 for some desired length and then severed along cutting edge 122. Thereafter, the length of blending tape may be applied to a workpiece along some desired demarcation zone. Here, the tape is dispensed without being simultaneously mated with a sheet of masking paper. Mounting bracket 130 provides easy and convenient means for mounting dispenser B to work table, work station, or the like as may be desired.

In the arrangement of FIG. 1, however, which involves masking paper feeder C, the operator aligns the tape dispenser B with one side edge of the roll 154 of masking paper. Optionally, the roll 164 of masking tape is aligned with the roll 154 at the other side edge. The operator pulls a desired amount of the paint mask which includes at least the blending tape and the masking paper 32 from the paint mask feeding apparatus. To sever the withdrawn paint mask, the operator utilizes cutting edge 160 as is conventional. Next, the painting mask is positioned and applied to a workpiece as previously described above with reference to FIG. 3. The workpiece may then by spray painted and the painting mask subsequently removed and discarded.

The subject tape dispenser has been found to be particularly useful for dispensing a new type of so-called blending tape. The arrangement is particularly well suited for application to spray painting environments such as those commonly found in the automotive industry, although it is deemed to be equally applicable to other uses. The versatility of the device is demonstrated by the alternative manners in which it may be used as described above.

The invention has been described with reference to the preferred embodiment. Obviously modifications and alterations will occur to others upon reading and understanding the foregoing specification. It is our intention to include all such modifications and alterations insofar as they come within the scope of the appended claims or the equivalents thereof.

Having thus described the invention, it is now claimed:

1. A layered blending tape dispensing apparatus comprising in combination:

a roll of layered blending tape including a hollow core and an elongated length of blending tape wrapped spirally around the core, the blending tape including a mask layer having one surface coated by an adhesive layer, an elongated mask section adhered to a portion of the adhesive layer generally along one side edge of the mask layer and extending longitudinally thereof, and an elongated release strip adhered to the remaining portion of the adhesive layer and extending longitudinally thereof, said release strip being selectively removable from said adhesive layer remaining portion;

a frame to which an axle is operatively connected;

a tape mounting hub which frictionally receives the hollow core and which is rotatably mounted on the axle;

a tape roll retainer, the retainer including a first end which is received by one portion of the frame, a second end which is removably received by another portion of the frame, and an elongated spring section extending between the first and second ends, the elongated spring portion extending transverse to the axle adjacent one side face of the roll of tape;

a braking means for selectively controlling the angular velocity of the hub for eliminating backlash of the blending tape during tape dispensing; and, separating means disposed adjacent the hub for automatically separating the release strip from the adhesive layer.

2. The combination as set forth in claim 1 wherein said axle is mounted at one end to a frame and threadedly receives a retaining member at its other end, the retaining member having a smaller radial cross-sectional dimension than the hollow core in order that the hollow cores of a plurality of tape rolls can be frictionally received on and removed from the hub without removing the retaining member from the axle.

3. The combination as set forth in claim 2 wherein said brake means includes a brake pad received by the axle intermediate the hub and frame and a spring interposed between the retaining member and the hub, threaded adjustment of the retaining member causing an adjustment in the compression of the spring to vary the degree of frictional engagement between the hub and the brake pad, whereby the angular velocity of the hub may be selectively controlled.

4. The combination as set forth in claim 1 wherein the separating means includes a roller guide around which the mask layer, the adhesive layer and the mask section traverse during dispensing and a release strip engaging surface disposed closely adjacent the roller guide for directing the release strip away from the mask layer.

5. The combination as set forth in claim 1 wherein the frame further includes a base wall having one end of the axle mounted thereto, a first flange extending from the base wall in generally the same direction as the axle and having an elongated aperture therein extending generally parallel to the axle, and a second flange extending from the base wall in generally the same direction as the axle and having an elongated slot therein extending generally parallel to the axle, the first end of the retainer being slidably received in the elongated aperture and the second end of the retainer being removably received in the slot to allow the transverse distance between the retainer and the frame base wall to be adjusted for selectively accommodating tape rolls of different widths.

6. The combination as set forth in claim 1 wherein the frame includes a base wall with first and second spaced apart flanges extending outwardly therefrom in a direction generally normal thereto, the axle having one end mounted to the base wall generally centrally of the first and second flanges so as to extend outwardly therefrom in generally the same direction as and parallel to the flanges.

7. The combination as set forth in claim 6 wherein the separating means is mounted on the base wall adjacent the first flange with the first flange further including an opening for providing access to the separating means.

8. The combination as set forth in claim 6 wherein the second flange has an outlet opening through which the mask layer, the adhesive layer and the mask section are fed during tape dispensing after the release strip is separated therefrom.

9. The combination as set forth in claim 8 further including a roller guide disposed adjacent the outlet opening toward the mask layer side of the tape and a cutting edge disposed adjacent the outlet opening opposite the mask layer side of the tape.

10. A layered tape dispensing apparatus comprising:

- a frame having a base wall with first and second flanges extending generally transversely outward from the base wall;
- an elongated axle mounted by a first end thereof transverse to the base wall to extend therefrom in the same direction as the first and second flanges;
- a tape mounting assembly received on the axle adapted for rotatably mounting a roll of layered tape;
- an extensible tape roll retainer operatively disposed generally parallel to the base wall and extending between the first and second flanges, the retainer being selectively removable from association with at least one of the flanges; and,
- separating means mounted to the frame base wall adjacent the tape mounting assembly adapted to selectively separate layers of a blending tape threaded therepast during a dispensing operation.

11. The tape dispensing apparatus as set forth in claim 10 wherein the tape mounting assembly includes a braking means for eliminating backlash of the blending tape.

12. The tape dispensing apparatus as set forth in claim 10 wherein the tape mounting assembly further includes a hub received by the axle adapted to frictionally receive the interior of a core of the roll of layered tape and wherein a retaining member is threadedly received on the second end of the axle for retaining the hub in position.

13. The tape dispensing apparatus as set forth in claim 12 wherein the braking means includes an annular brake pad on said axle cooperating between the frame base wall and one side of the hub and a longitudinally compressible spring on the axle interposed between the retaining member and the hub, threaded rotation of the retaining member on the axle effecting compression adjustment of the spring resulting in an adjustment of the frictional engagement of the hub and the brake pad for eliminating backlash during the dispensing of tape from a tape roll associated therewith.

14. The tape dispensing apparatus as set forth in claim 10 wherein the frame further includes a mounting bracket for mounting the tape dispensing apparatus to some associated support structure.

15. The tape dispensing apparatus as set forth in claim 10 wherein the separating means includes a roller guide over which at least one layer of an associated layered tape traverses and an engaging surface disposed adjacent the roller guide for directing at least a part of a layer away from the one layer of the associated layered tape.

16. The tape dispensing apparatus as set forth in claim 10 wherein the second flange has an outlet opening through which the one tape layer of the associated tape is dispensed, a roller guide disposed toward one side of the outlet opening and a cutting edge disposed toward the other side of the outlet opening with the one layer of an associated tape adapted to be fed between the roller guide and the cutting edge during tape dispensing.

17. A tape dispensing apparatus comprising:

- a frame having a base wall with first and second flanges extending generally transversely outward from the base wall;
- an elongated axle mounted by a first end thereof transverse to the base wall to extend therefrom in the same direction as the first and second flanges;
- a tape mounting assembly received on the axle which is adapted for rotatably mounting a roll of tape; and,
- an elongated spring section extending between the first and second flanges spaced from and generally parallel to the base wall for retaining the tape roll, the elongated spring being selectively removable from association with at least one of the flanges.

18. The tape dispensing apparatus as set forth in claim 17 wherein a first end of the elongated spring section of the retainer is slidably received in an elongated aperture in the first flange and a second end of the elongated spring section is removably received in an elongated slot in the second flange.

* * * * *